United States Patent [19]

Kindrick

[11] 4,439,572

[45] Mar. 27, 1984

[54] ZINC OXIDE-ZINC SALT SMOKE SUPPRESSANT/FLAME RETARDANTS

[75] Inventor: Robert H. Kindrick, Grosse Ile, Mich.

[73] Assignee: The Sherwin-Williams Company, Cleveland, Ohio

[21] Appl. No.: 443,723

[22] Filed: Nov. 22, 1982

Related U.S. Application Data

[63] Continuation-in-part of Ser. No. 315,336, Oct. 26, 1981, abandoned.

[51] Int. Cl.$^3$ .............................................. C08K 3/38
[52] U.S. Cl. ................................... 524/405; 524/399; 524/411; 524/417; 524/420; 524/423; 524/432; 524/434; 524/472; 523/200; 523/210; 523/205; 523/223; 106/18.27

[58] Field of Search .................. 106/18.27; 524/399, 524/405, 411, 417, 420, 423, 432, 434, 472; 523/210, 200, 205, 223

[56] References Cited

U.S. PATENT DOCUMENTS

| | | | |
|---|---|---|---|
| 2,785,990 | 3/1957 | Coulter | 106/296 |
| 3,900,441 | 8/1975 | King | 524/406 |
| 3,945,974 | 3/1976 | Schwarcz et al. | 524/409 |
| 3,957,723 | 5/1976 | Lawson et al. | 524/432 |
| 4,111,885 | 9/1978 | Abu-Isa | 524/405 |

*Primary Examiner*—Melvyn I. Marquis
*Attorney, Agent, or Firm*—James V. Tura; Robert E. McDonald

[57] ABSTRACT

This invention is directed to halogen-containing polymeric compositions containing a smoke suppressant/flame retardant comprising intimate mixtures of zinc oxide and zinc salts.

13 Claims, No Drawings

ZINC OXIDE-ZINC SALT SMOKE SUPPRESSANT/FLAME RETARDANTS

This application is a continuation in part of application Ser. No. 315,336 filed on Oct. 26, 1981 now abandoned.

BACKGROUND OF THE INVENTION

This invention relates to polymeric compositions and specifically to smoke suppressant/flame retardant additives for polymeric compositions comprising halogen-containing polymers. More specifically, this invention relates to a method of improving the flame and smoke suppressing characteristics of halogen-containing polymeric compositions by adding to said compositions effective amounts of at least one inhibitor consisting essentially of an intimate mixture of zinc oxide and zinc salts, i.e. zinc borate, zinc phosphate or zinc sulfide.

Polymeric compositions comprising halogen-containing polymers used for sheeting, synthetic fibers and the like are hazardous due to flammability and it is well known to incorporate within these polymeric compositions certain flame retardants and/or smoke suppressants to reduce both the flammability and smoke. Moreover, these polymeric compositions are known to create large amounts of smoke during burning which is more hazardous then the flame. Thus, there is increased concern for safety due to the fact that smoke evolution during the burning of these plastics is as much a hazard if not more than the flames. Certain additives can be used to avoid the hazards due to smoke and toxic gases. These additives include, for example, antimony oxide either alone or in combination with other compounds known to suppress both flame and smoke in halogen-containing compositions.

Accordingly, it is an object of this invention to provide a smoke suppressant and flame retardant for halogen-containing polymeric compositions comprising an intimate mixture of zinc oxide and certain metal salts of zinc which are more effective than either one of the components alone. Zinc oxide alone has not been found useful as a smoke suppressant or flame retardant particularly in polyvinyl chloride in that it causes rapid degradation during processing. For example, trace amounts of hydrochloric acid in these polymeric resins converts the zinc oxide to the chloride which catalyzes the dehydrochlorination of the resin resulting in a phenomenon known as zinc failure. Zinc failure manifests itself by the appearance of black spots in the plastic film. Continual degradation results in the loss of hydrochloric acid and finally the total destruction of the polymer. To avoid these problems, various stabilizers have been used including, for example, the use of barium or cadium salts such as the stearates to prevent or at least delay zinc failure. However, these stabilizers alone are generally not sufficient to avoid the potentially danger of dehydrochlorination when the polymeric materials are used in high pressure equipment such as extruders, injection molding machines and the like.

Moreover, zinc oxide alone is not recommended as a polymeric additive since in certain flame tests zinc oxide appeared to be too reactive. In some instances, the flames were found to spread in formulations utilizing zinc oxide and in some cases worse then the control which had no fire retardant present in the formula. Moreover, other commercially available additives are more costly and therefore it would be an advantage if zinc oxide could be used to reduce cost at least as a partial if not a total replacement for these flame retardants or smoke suppressants, e.g. molybdum oxides, zinc borates, antimony oxides, etc.

SUMMARY

This invention relates to a process of utilizing a mixture of zinc oxide and zinc salts of certain acids as additives for halogen-containing polymeric compositions which afford all of the advantages achieved by using zinc oxide alone and has improved smoke and fire retardancy and avoids the problems known as zinc failure in chlorinated polymers. In accordance with this invention, zinc oxide is slurried with certain acids, e.g. phosphoric acid to produce an intimate mixture of zinc oxide and the zinc salt of such acid wherein the zinc oxide is present in the mixture in amounts ranging from 50 to 95% by weight and the zinc salt is present in amounts ranging from 5 to 50% by weight of the mixture.

Various polymeric compositions and particularly polyvinyl chloride, polyvinylidine chloride, and the polyolefins such as polyethylene and polypropylene with halogenated materials can have the flame and smoke suppressing characteristics improved by incorporating therein small but effective amounts of at least one inhibitor of this invention. The inhibitor consists essentially of an intimate mixture of zinc oxide and at least one zinc salt selected from the group consisting of zinc phosphate, and zinc sulfide wherein the zinc salt ranges from about 5 to 50% by weight of the mixture. Small but effective amounts of the zinc oxide mixture is added to the halogen-containing polymeric compositions, i.e. an inhibitor amount ranging from about 1.5 to 10% and preferrably from 3 to 7% by weight of the halogenated polymeric materials. In addition, other known inhibitors such as antimony oxide may be added to the polymeric compositions in combination with the mixture of zinc oxide and zinc salts. These other inhibitors may be added to the halogen-containing polymeric compositions in amounts ranging from 1.5 to 5.0% by weight of the polymers in addition to the zinc oxide and zinc salts.

It is therefore an object of this invention to provide a process whereby zinc oxide is modified by converting a portion thereof to the zinc salt of the acid, e.g. phosphoric acid, or sulfuric acid to provide an intimate mixture of the oxide and zinc salt of such acid to improve the flame retardancy and smoke suppressant characteristics of the compositions. Thus, these zinc oxide salt mixtures can be used as a total replacement or at least a partial replacement of other additives and thereby avoid the problem of zinc failure, etc. which generally occurs in chlorinated polymeric compositions. It is another object of this invention to provide an intimate mixture of zinc oxide and zinc salts which are comparatively lower in cost then other known flame and smoke suppressants.

DETAILED DESCRIPTION

The zinc salt/zinc oxide mixtures characterized as zinc oxide coated with the zinc salts are prepared by slurrying zinc oxide in a dilute solution of the acid to form the corresponding salt on the surface thereof. In accordance with this invention, the zinc oxide is coated by the salt formed in situ with the acid resulting in a product which is primarily zinc oxide coated with the zinc salt. More specifically, in accordance with this invention a zinc phosphate coated zinc oxide was prepared in an exothermic reaction, when particulate zinc oxide was slurried in approximately a 10% solution of orthophosphoric acid while stirring at temperatures ranging from about 60° to 80° C. The filtered and dried product comprised from about 50 to 95% by weight of zinc oxide with a coating ranging from about 5 to 50% of zinc orthophosphate.

Similarly, zinc oxide coated zinc sulfide product was prepared by dispersing sodium acid sulfide or $H_2S$ in a dilute 10% (sulfuric acid solution) wherein zinc oxide is slurried. After standing over night, the filtered, washed and dried slurry resulted in a product that was about 30% by weight zinc sulfide present as a coating on the surface of the zinc oxide.

The following examples illustrate the use of zinc oxide/zinc salt mixtures in various rigid and flexible halogen-containing polymeric compositions. The tunnel flame spread ratios (FSR) had been determined in all cases with the flame spread of red oak being used as a standard value of 100. Also reported in the various examples is the Arapahoe percent smoke development of the burning polymer, as well as heat stability tested at 200° C. for both the Haake Rheocord and oven heat stability test. The stability test are reported in minutes until break-down in stability as noted by the change in torque or color, respectively.

It should be understood that these examples are illustrations of various aspects of this invention and are not to be considered limitation on the scope of the invention. For purposes of beverity, zinc phosphate-coated zinc oxide shall be abbreviated herein as ZnO/ZnP. The zinc sulfide-coated zinc oxide shall be abbreviated as ZnO/ZnS. All quantities of materials in the formulations of the examples are reported as parts of the material per 100 parts of resin (phr).

EXAMPLE I

To 100 parts PVC resin (General Tire Vy 105) was added 26 phr dioctylphthalate (DOP), 20 phr isodecyldiphenylphosphate (Santicizer 148, Monsanto), 0.3 phr stearic acid, 41 phr calcium carbonate, 16 phr titanium dioxide, 3 phr Ba/Cd/Zn stabilizer (Mark KCB, Argus), 2.1 phr antimony and 4.1 phr of zinc salt-coated zinc oxide mixture as the flame retardant/smoke suppressant. The tunnel FSR, Arapahoe percent smoke and Rheocord and oven stability tests for these materials are reported in Table I.

TABLE I

| Supplemental Flame Retardant | Tunnel FSR | Arapahoe % Smoke | Minutes at 200° C. Rheocord | Oven |
|---|---|---|---|---|
| 6.2 phr $Sb_2O_3$ (positive control) | 57 | 7.5 | 13.3 | 20 |
| ZnO/ZnP(2.1 $Sb_2O_3$) | 60 | 5.1 | 10.5 | 20 |
| ZnO/ZnS(2.1 $Sb_2O_3$) | 58 | 5.1 | 14.0 | 25 |
| Zinc Borate (Prior Art Material) | 58 | 6.9 | 7.7 | 20 |

The samples containing the zinc salt mixture of this zinc oxide invention all had flame spread ratios comparable to the commercial zinc borate product. It can be seen that a lower smoke value was achieved by using the zinc oxide zinc salt mixture of this invention in comparison to the control and the commercially available zinc borate product. In all examples, the stability of the polymer was comparable or better than the commercial product.

EXAMPLE II

Zinc phosphate-coated zinc oxide containing 10, 20 and 30% by weight zinc phosphate were tested in a PVC formulation plasticized only with DOP which is especially sensitive to zinc failure. The formulation comprised 100 parts PVC resin (Conoco 5385), 50 phr DOP, 7.5 phr epoxidized soy bean oil, 0.8 phr Ba/Cd/Zb stabilizer (Mark KCB, Argus), 2 phr antimony oxide and 4 phr of the 10, 20 and 30% ZnO/ZnP coated zinc coated zinc oxide mixture. The results of the Rheocord stability test and Arapahoe percent smoke tests are reported in Table II.

TABLE II

| Coated ZnO Retardant | Rheocord/200° | Arapahoe % Smoke |
|---|---|---|
| ZnO 100 | 2.5 | 8.9 |
| ZnO/ZnP 90/10 | 3.2 | 9.5 |
| ZnO/ZnP 80/20 | 3.0 | 10.2 |
| ZnO/ZnP 70/30 | 6.5 | 9.4 |

It can be seen from the above results that stability increases with increased zinc phophate concentration in the coated zinc oxide mixture while the percent smoke remains stable within experimental limits.

EXAMPLE III

The coated zinc oxide mixtures of this invention were tested in a wall covering formulation comprising 100 parts PVC resin (General Tire Vy 105), 28 phr DOP, 5 phr isodecyldiphenylphosphate, 0.3 phr stearic acid, 10 phr $TiO_2$, 3 phr Ba/Cd/Zn stabilizer (Mark KCB, Argus), 1.85 phr antimony oxide and 1.85 phr of the supplemental flame retardant/smoke suppressant of this invention. The results of this test are reported in Table III.

TABLE III

| Supplemental Flame Retardant | Tunnel FSR | Arapahoe % Smoke | Rheocord Stability Minutes at 200° C. |
|---|---|---|---|
| $CaCO_3$ (Negative Control) | 91 | 8.5 | 8.5 |
| ZnO/ZnP | 77 | 6.4 | 5.5 |
| ZnO/ZnS | 82 | 6.8 | 7.0 |

It can be seen that a significant reduction in the percent smoke as well as in the tunnel flame spread ratio is afforded by zinc salt-coated zinc oxide mixture of this invention.

EXAMPLE IV

The 70/30 zinc phosphate-coated zinc oxide mixture of Example II was tested for flame and smoke evaluation in a PVC upholstery formulation made by the Chrysler Corporation and designated 039 Compound. A vertical burn test was used to provide after flame burn length. Arapahoe percent smoke and National Bureau of Standards (NBS) 4 minute smoke test were also performed. The results of this testing is reported in Table IV.

TABLE IV

| Composition Percentage | | | After Flame Burn Length | Arapahoe % Smoke | NBS Smoke, 4 Minutes | |
| --- | --- | --- | --- | --- | --- | --- |
| 039 cmpd | Sb$_2$O$_3$ | ZnO/ZNP | | | Ds F* | Ds S** |
| 100 | — | — | Complete Burn | — | — | — |
| 95 | 5 | — | 2.0 sec/2.7 in | 7.2 | 582 | 105 |
| 90 | — | 10 | Complete Burn | — | — | — |
| 87.5 | 2.5 | 10 | 4.0 sec/1.8 in | 6.2 | 122 | 57 |

*Flaming
**Smouldering

From the above test, excellent results were obtained in the NBS smoke test when half of the antimony oxide was replaced by a four to one ratio of the ZnO/ZnP mixture of this invention. The 039 Compound also contains about 2.5% antimony oxide not included in the antimony oxide column of Table IV as well as about 1.2% zinc borate. The plasticizer level in the 039 compound is about 80 phr of an unknown proprietary type.

Similar smoke reductions were obtained when the zinc salt-coated zinc oxide mixtures of this invention were employed in a PVC wire and cable formulation and in wall covering formulations such as that used in Example II with the exception of the use of tricresyl phosphate as a plasticizer in place of IDDP.

EXAMPLE V

Economical V-0 polypropylene formulations evaluated in the UL-94 vertical burn test could be obtained with the use of 70/30 ZnO/ZNP in a resinated chloroparaffin. The composition of the tested resin reported in percent by weight of the entire resin and the UL-94 rating are set forth in Table V.

TABLE V

| Resin Component | Run 1 | Run 2 | Run 3 |
| --- | --- | --- | --- |
| Polypropylene* | 62 | 56–72 | 62 |
| Chlororez TM 760 | 27 | 22–32 | 27 |
| Ba/Cd stabilizer | 1 | 1 | 1 |
| Sb$_2$O$_3$ | 10 | 3–7 | 5 |
| ZnO/ZNP | — | 3–7 | — |
| CaCO$_3$ | — | — | 5 |
| UL-94 Rating | V-O | V-O | B |

*Amoco 4016, melt index = 5

The above test shows that much of the expensive antimony oxide may be replaced by the phosphate coated-zinc oxide mixture of this invention with no loss in the vertical burn rating. The use of calcium carbonate as a control does not provide an acceptable V-0 material.

EXAMPLE VI

A polybutene-1 formulation used in tubing for compressed air and requiring a UL-94 rating of V-2 was tested with the flame retardant/smoke suppressant mixture of this invention. In a formulation which included 78–88% polybutene-1 resin (Shell 1600 grade) 5–12% chloroparaffin (either Chlorowax TM 70 or Chlororez TM 760) there was no loss of rating when the flame retardant comprised 1.5 to 5% Sb$_2$O$_3$ and 5 to 1.5% zinc phosphate-coated zinc oxide mixture of this invention.

EXAMPLE VII

Formulations of low density polyethylene (LDPE) at a 91% level of the formulation and 5% chlorinated paraffin showed no loss in UL-94 ratings when half of the 4% antimony oxide was replaced by the zinc phosphate-coated zinc oxide mixture of this invention resulting in a lower cost product.

EXAMPLE VIII

A zinc phosphate-coated zinc oxide mixture made in accordance with the invention was evaluated in a high density polyethylene (HDPE) formulation which included 88% high density polyethylene (Amoco), 7% chlorinated paraffin and 5% antimony oxide. There was no loss in the UL-94 rating of V-2 of this formulation when half of the antimony oxide was replaced by the ZnO/ZnP mixture of this invention. The use of the zinc phosphate salt-coated zinc oxide resulted in a significantly lower cost for the resin.

From the foregoing it can be seen that an effective flame retardant/smoke suppressant can be obtained by reacting particulate zinc oxide with a mineral acid to produce the zinc salt of the acid as a mixture or coating on zinc oxide. When used as a partial or total replacement for other flame retardants in polymer compositions, the zinc salt-coated zinc oxide mixtures of this invention shows equivalent or better flame spread rating as well as a significant reduction in the smoke produced by the resins. It has also been shown that the flame retardant/smoke suppressant material of this invention may be broadly used in polymer formulations including polyolefins and PVC.

While this invention has been described by a number of specific examples it is obvious that there are other variations and modifications which can be made without departing from the spirit and scope of the invention as set forth in the appended claims.

The invention claimed is:

1. A method of improving the flame and smoke suppressant characteristics of halogen-containing polymeric compositions comprising polyvinyl chloride, polyvinylidine chloride, and or polyolefins with chlorinated paraffins which comprises adding to said polymeric compositions effective amounts of an inhibitor consisting essentially of a mixture of zinc oxide and zinc salt selected from the groups consisting of, zinc phosphate and zinc sulfide wherein the zinc salt range from about 5 to 50% by weight of the mixture.

2. The method of claim 1 further characterized in that the effective amount of the inhibitor ranges from about 1.5 to 10% by weight of the polymeric compositions.

3. The method of claim 2 further characterized in that the effective amount of the inhibitor ranges from about 3 to 7% by weight of the polymeric compositions.

4. The method of claim 1 further characterized in that the polymeric composition comprises polyvinyl chloride.

5. The method of claim 1 further characterized in that the polymeric composition comprises polyethylene with chlorinated paraffin.

6. The method of claim 1 further characterized in that the zinc salt ranges from about 10 to 30% by weight of the mixture.

7. The method of claim 6 further characterized in that the zinc salt is zinc phosphate.

8. The method of claim 6 further characterized in that the zinc salt is zinc sulfide.

9. The method of claim 1 further characterized in that a flame retardant amount of antimony oxide is added to the polymeric composition.

10. The method of claim 9 further characterized in that the antimony oxide is added in an amount ranging from about 1.5 to 5.0% by weight of the polymeric compositions.

11. The method of claim 10 further characterized in that the antimony oxide is added to the polymeric composition in amounts ranging from about 1.5 to 5.0% by weight and the mixture of zinc oxide and zinc salt is added to the polymeric composition in an amount ranging from about 3 to 7% by weight.

12. The method of claim 11 further characterized in that the inhibitor consists essentially of a mixture of zinc oxide and zinc phosphate.

13. The method of claim 11 further characterized in that the inhibitor consists essentially of a mixture of zinc oxide and zinc sulfide.

* * * * *